No. 635,977. Patented Oct. 31, 1899.
A. G. POWELL.
VEHICLE.
(Application filed Sept. 16, 1899.)
(No Model.)

WITNESSES:
John W Reere Jr.
Mae Hoffmann

INVENTOR
Abram G. Powell
by Thos Croasdale
ATTORNEY

THE NORRIS PETERS CO., PHOTO-LITHO., WASHINGTON, D. C.

UNITED STATES PATENT OFFICE.

ABRAM G. POWELL, OF PHILADELPHIA, PENNSYLVANIA.

VEHICLE.

SPECIFICATION forming part of Letters Patent No. 635,977, dated October 31, 1899.

Application filed September 16, 1899. Serial No. 730,686. (No model.)

*To all whom it may concern:*

Be it known that I, ABRAM G. POWELL, a citizen of the United States, residing at Philadelphia, in the county of Philadelphia and State of Pennsylvania, have invented a new and useful Vehicle, of which the following is a specification.

My invention relates to improvements in vehicles, and particularly to that class of vehicles in which each wheel is provided with an independent axle.

The object of my invention is to provide efficient means for bracing the frames or for connecting said axles to the body structure.
I attain this object by the mechanism illustrated in the accompanying drawings, in which—

Figure 1:
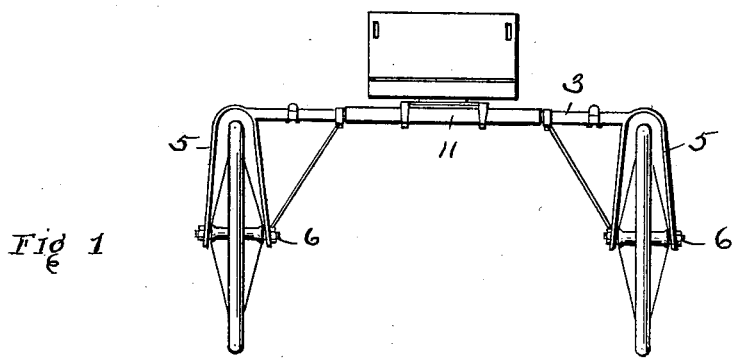
Figure 2:
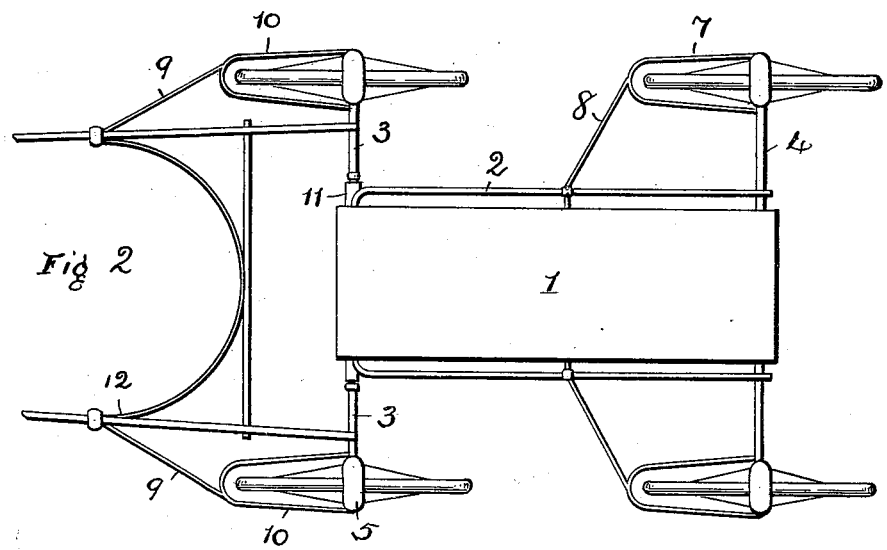
Figure 3:
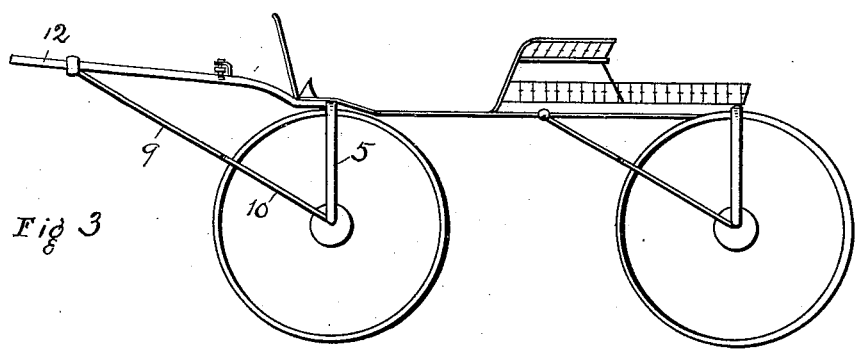

Figure 1 is a front view of my device with the shafts removed. Fig. 2 is a plan view of same with the shafts partly broken away, and Fig. 3 is a side elevation of same.

In a vehicle of this class it has heretofore been the practice to brace the forks of the rear wheels by connecting-rods inclining in front of the wheels to the framework or body of the vehicle, so that a more direct traction or pull between the body of the vehicle and the axle is secured. This, however, has been impossible with respect to the front wheels, owing to the fact that there is no rigid framework of the vehicle to which forwardly-projecting braces could be attached. The strain, therefore, to which was subjected the vertical forks which were only braced laterally or from the rear has been a serious disadvantage to this class of vehicles.

Referring to the drawings of my device, 1 represents the body of the vehicle, 2 the framework supporting the same, and 3 and 4 the horizontal cross-pieces which usually serve as the axle-bars of an ordinary vehicle, but which in my device are supported upon vertical forks 5, to the lower ends of which are secured axles of the wheels. With respect to the rear wheels a second fork inclines downwardly to the front of the axle, and from its closed end a connecting-rod 8 extends to the framework of the vehicle. In order to provide a rigid framework with which to connect by a similar rod 9 the forward fork 10 of the front wheel, I sleeve the forward horizontal cross-bar 3 in the tube 11, which tube may be secured to the fifth-wheel or other similar structure of the vehicle-body. The bar 3 is rotatable in said tube 11, but rigidly connected with the forks of the front wheel. To this bar 3 is also rigidly connected the shaft structure 12, so that the forks 5 of the front wheels participate in the movements of the shafts or tongue, as the case may be. I am now able to connect the forward forks 10 of the front wheels to the shaft structure 12 by the rods 9, thus giving an efficient forward pulling-brace similar to that of the back wheels, thus relieving the vertical forks 5 of the severe lateral strain to which they have heretofore necessarily been subjected.

What I claim is—

1. In a vehicle-body the combination of horizontal cross-pieces at either end, each cross-piece supported at its two ends upon forks extending from the axles of the wheels, the front cross-piece being sleeved in a tube secured to the body structure and rigid with the shafts, with brace-rods connected between the lower end of the forks and the shafts, substantially as and for the purpose described.

2. In a vehicle with wheels having independent axle members, the body of the vehicle being connected therewith by forks, the combination of a front horizontal cross-bar supported on the forks of the front wheels and sleeved in a tube secured to the vehicle-body and rotatable therein, said bar also rigidly secured to the shaft or tongue structure and a brace between said shaft or tongue structure and the lower ends of said forks, substantially as and for the purpose described.

3. In a four-wheeled vehicle, the axles of which are connected to the body structure by forks the combination of a horizontal cross-bar rigidly connected with the forks of the front wheels and rotatably secured intermediate said connections to the body of the vehicle and also rigidly secured to the shaft or tongue structure, with forwardly-extending braces on the lower extremities of said front forks to the shaft or tongue structure, substantially as and for the purpose described.

4. A four-wheeled vehicle with pneumatic-tired wheels having the forks of the front wheels rigidly connected with the horizontal cross-bar and with the tongue or shaft structure and braced thereto, said horizontal cross-bar being rotatably connected with the vehicle-body, substantially as and for the purpose described.

ABRAM G. POWELL.

Witnesses:
JOHN THIEL,
MAE HOFFMANN.